United States Patent

Aoki et al.

[11] Patent Number: 5,938,115
[45] Date of Patent: Aug. 17, 1999

[54] HEATING APPARATUS FOR VEHICLE

[75] Inventors: Shinji Aoki, Kariya; Toshio Morikawa, Toyota; Hajime Ito, Kariya; Goro Uchida, Toyota; Yasushi Kato, Toyota; Norifumi Ban, Toyota, all of Japan

[73] Assignee: Denso Corporation, Kariya, Japan

[21] Appl. No.: 08/937,050

[22] Filed: Sep. 24, 1997

[30] Foreign Application Priority Data

Sep. 30, 1996 [JP] Japan .................................. 8-259431

[51] Int. Cl.⁶ ...................................................... B60H 1/02
[52] U.S. Cl. .................................... 237/12.3 R; 126/247; 122/26; 123/142.5 R
[58] Field of Search ........................ 237/12.3 B, 12.3 R; 126/247; 122/26; 123/142.5 R

[56] References Cited

U.S. PATENT DOCUMENTS

| 3,602,005 | 8/1971 | Kaye ........................................ 62/230 |
| 4,492,195 | 1/1985 | Takahashi et al. ....................... 123/339 |
| 4,993,377 | 2/1991 | Itakura .............................. 123/142.1 R |
| 5,163,399 | 11/1992 | Bolander et al. ........................ 123/339 |
| 5,197,423 | 3/1993 | Ebesu et al. ......................... 123/195 A |
| 5,329,770 | 7/1994 | Ward ......................................... 60/597 |

FOREIGN PATENT DOCUMENTS

A-3-57877   3/1991   Japan .
A-6-92134   4/1994   Japan .

Primary Examiner—Henry Bennett
Assistant Examiner—Derek S. Boles
Attorney, Agent, or Firm—Harness, Dickey & Pierce, PLC

[57] ABSTRACT

When a driver performs a steering operation with a small steering angle when a vehicle is stopped, a viscous clutch of a viscous heater is turned on after setting an idling rotational speed of an engine to a high value to prevent an engine stall. Further, when a driver performs the steering operation with a large steering angle when the vehicle is stopped, the viscous clutch is not turned on so that the viscous heater is not operated, thereby greatly reducing a driving load applied to the engine and a V-belt thereof.

18 Claims, 9 Drawing Sheets

FIG. 10

HEATING APPARATUS FOR VEHICLE

CROSS-REFERENCE TO RELATED APPLICATION

This application is related to and claims priority from Japanese Patent Application No. Hei. 8-259431 filed on Sep. 30, 1996, the contents of which are hereby incorporated by reference.

BACKGROUND OF THE INVENTION

1. Field of the Invention

The present invention relates to a heating apparatus for a vehicle, in which a heat-generating unit using a shearing force, for increasing a temperature of cooling water for cooling a water-cooled engine, is switched based on a load applied to a hydraulic pump of a power steering device.

2. Description of Related Art

Conventionally, as a heating apparatus for a vehicle, a hot water type heating apparatus for heating a passenger compartment has been generally known. In the hot water type heating apparatus, cooling water for cooling a water-cooled engine is supplied to a heater core disposed in a duct, and air heated while passing through the heater core is blown into the passenger compartment by a blower to heat the passenger compartment of the vehicle.

In recent years, it is desired to improve an efficiency of the engine installed in an engine compartment. When the efficiency of the engine is improved, a load of the engine is decreased so that cooling water for cooling the engine cannot be sufficiently heated. Further, in a case of a vehicle having a diesel engine or a lean burn engine, heat generated in the engine is too small to heat the cooling water with engine sufficiently. In this case, because a temperature of cooling water to be supplied to a heater core cannot be maintained at a predetermined temperature (e.g., 80° C.), there occurs a problem in that a heating capacity for the passenger compartment is insufficient.

To overcome such a problem, as disclosed in U.S. Pat. No. 4,993,377 and JP-A-3-57877, the following heating apparatus for a vehicle is conventionally proposed. In the heating apparatus for a vehicle, a heat-generating unit using a shearing force, for heating cooling water to be supplied to a heater core from an engine, is disposed in a cooling water circuit, and the heat-generating unit is operated when the cooling water temperature is lower than a set cooling water temperature to improve the heating capacity for the passenger compartment.

The heat-generating unit transmits a driving force of the engine to a shaft through a belt transmitting mechanism and the electromagnetic clutch. A heat-generating chamber is formed in a housing of the heat-generating unit, and a cooling water passage is formed at an outer periphery of the heat-generating chamber. A rotor which rotates integrally with the shaft is disposed in the heat-generating chamber, and a shearing force generated by a rotation of the rotor is applied to viscous fluid such as silicon oil having a high viscosity, sealed in the heat-generating chamber to generate heat. The cooling water circulating in the cooling water passage is heated by the generated heat.

Further, in recent years, a power steering device is generally installed in a vehicle to simplify a driver's steering operation. In the power steering device, a driving force of an engine is transmitted to a hydraulic pump through a belt to generate a hydraulics as a driving source of the device. However, when a driver performs a steering operation when the vehicle is stopped, a load applied to the hydraulic pump of the power steering device becomes larger, and therefore a large driving load is applied to the engine. At this time, if the heat-generating unit is operated to increasing the heating capacity for a passenger compartment, a large driving load is further applied to the engine.

As a result, the engine may be stopped and a belt of the hydraulic pump slides, and therefore the hydraulic pump is not normally operated and a noise is caused. When a belt is hung on both of a rotor of the hydraulic pump of the power steering device and a rotor of the heat-generating unit, the above-described problems are readily caused. However, even if both belts are respectively hung on the rotor of the hydraulic pump and the rotor of the heat-generating unit, the above-described problems may be caused.

SUMMARY OF THE INVENTION

In view of the foregoing problems of the prior art, it is a first object of the present invention to provide a heating apparatus, for a vehicle, which can normally operate a rotating apparatus such as a hydraulic pump by reducing a driving load applied to a driving source such as an engine.

It is a second object of the present invention to provide a heating apparatus, for a vehicle, which can suppress noise caused when a driving force transmission unit slides.

Further, it is a third object of the present invention to provide a heating apparatus for a vehicle, which can simplify a driver's steering operation when the vehicle is stopped.

According to an aspect of the present invention, a heating control unit controls a clutch unit to stop a rotation of a rotor of a heat-generating unit when a load applied to a driving source unit is more than a predetermined load. Therefore, a load applied to the driving source unit is greatly reduced, noise generated when a driving force transmission unit slides can be suppressed, and a rotating unit such as a hydraulic pump, a blower or a compressor can be normally operated.

Preferably, the heating control unit controls the clutch unit to stop the rotor of the heat-generating unit when a load applied to the hydraulic pump, detected by a load detection means, is more than a predetermined value. Therefore, a sufficient hydraulics can be supplied to a power steering device. Thus, even if a driver performs a steering operation when a vehicle is stopped, the driver's steering operation can be relieved.

More preferably, the heating control unit includes physical amount detection means for detecting a physical amount relative to a pressure or a flow amount of oil discharged from the hydraulic pump, and the heating control unit controls the clutch unit to stop the rotor when the physical amount detected by the physical amount detection means is more than a predetermined value.

According to another aspect of the present invention, a heating control unit controls a clutch unit to rotate a rotor of a heat-generating unit after increasing an idling rotational speed of a driving source unit to a predetermined value when a load applied to the driving source unit is more than a first set value and lower than a second set value. Therefore, the rotating unit is normally operated and a thermal medium circulating between the driving source unit and a heating heat exchanger is heated to increase the heating capacity for the passenger compartment. Further, the heating control unit controls the clutch unit to stop a rotation of the rotor of the heat-generating unit when a load applied to the driving source unit is more than the second set value. Therefore, a load applied to the driving source unit is greatly reduced, a noise caused when the driving force transmission unit slides can be suppressed, and the rotating unit can be normally operated.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be described with reference to FIGS. 1–8.

Figure 1:
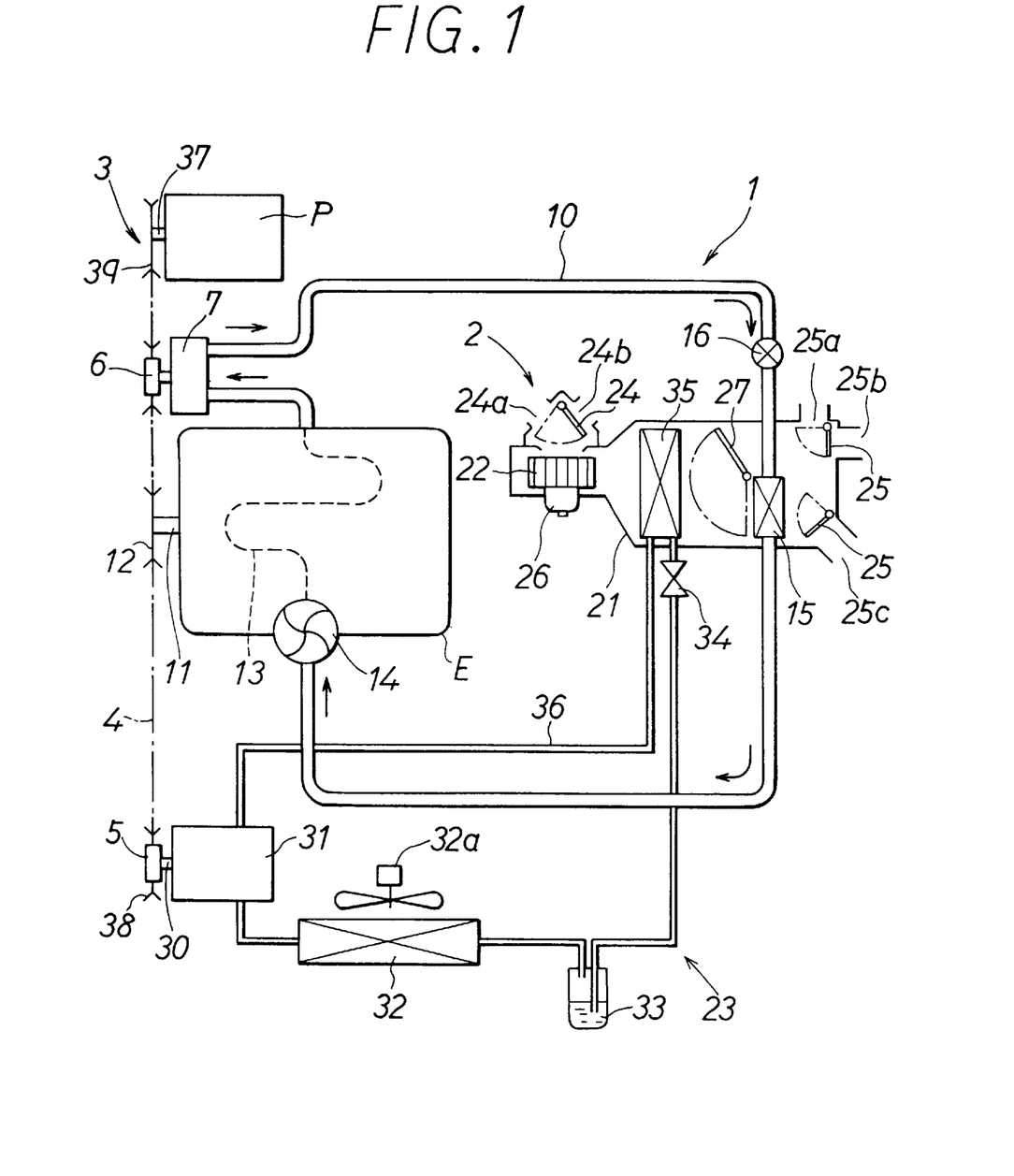
FIG. 1 is a schematic diagram showing an entire construction of an air-conditioning apparatus for a vehicle according to a first preferred embodiment of the present invention.

As shown in FIG. 1, an entire system 1 for a vehicle is equipped with a water-cooled diesel engine E (hereinafter referred to as "engine") disposed in an engine compartment of the vehicle, an air-conditioning unit 2 for air-conditioning a passenger compartment, a driving force transmission unit 3 for transmitting a driving force of the engine E, a heat-generating unit 7 using a shearing force (hereinafter referred to as "viscous heater") for heating cooling water for cooling the engine E, an air-conditioning ECU 100 (see FIG. 5) for controlling the air-conditioning unit 2, a viscous ECU 200 (see FIG. 5) for controlling the viscous heater 7, and an engine ECU 300 (see FIG. 5) for controlling the engine E.

The engine E is a heating source of a heating apparatus and a driving source for driving and rotating a compressor 31, a hydraulic pump P of a power steering device and the viscous heater 7. A crank pulley 12 is attached to an output shaft (i.e., crank shaft) 11 of the engine E. The engine E is provided with a cylinder block and a water jacket 13 around a cylinder head. The water jacket 13 is disposed in a cooling water circuit 10 through which the cooling water for cooling the engine E circuits.

In the cooling water circuit 10, there is disposed a water pump 14 for compulsorily pumping the cooling water, a radiator (not shown) for cooling the cooling water by performing heat exchanging between the cooling water and air, a heater core 15 for heating air by performing heat exchanging between the cooling water and air, a water valve 16 for adjusting an amount of the cooling water flowing into the heater core 15, and the like. The water pump 14 is disposed at an upstream side of the water jacket 13 of the engine E and is rotated by the crank shaft 11 of the engine E.

The air-conditioning unit 2 includes a duct 21, a blower 22, a refrigeration cycle 23, and the heater core 15. At an upstream air side of the duct 21, there is rotatably provided an inside/outside air switching damper 24 for selectively opening and closing an outside air inlet 24a and an inside air inlet 24b to switch an air inlet mode. At a downstream air side of the duct 21, there is rotatably provided an air mode switching damper 25 for selectively opening and closing a defroster air outlet 25a, a face air outlet 25b and a foot air outlet 25c to switch an air outlet mode. The blower 22 is rotated by a blower motor 26 to generate an air flow toward the passenger compartment in the duct 21.

The heater core 15 is disposed in the duct 21 at a downstream air side (i.e., downwind side) of the evaporator 26 and is connected to the cooling water circuit 10 at a downstream side of the viscous heater 7 with reference to the flow direction of the cooling water. The heater core 15 heats air by performing heat-exchanging between the air having passed through the evaporator 35 and the cooling water.

At an upstream air side of the heater core 15, there is rotatably provided an air-mixing damper 27. The air-mixing damper 27 adjusts a ratio between an amount of air (i.e., warm air) passing through the heater core 15 and an amount of air (i.e., cool air) bypassing the heater core 15 so that a temperature of air blown into the passenger compartment can be adjusted. The air-mixing damper 27 is driven by an actuator (not shown) such as a servomotor through a ring plate or a plurality of ring plates.

The refrigerant cycle 23 includes a compressor (i.e., refrigerant compressor) 31, a condenser (i.e., a refrigerant condenser) 32, a receiver (i.e., gas-liquid separator) 33, an expansion valve (i.e., decompressing device) 34, the evaporator (i.e., refrigerant evaporator) 35, and refrigerant pipes 36 connecting the parts of the refrigerant cycle in a round shape. The compressor 31 is equipped with a shaft 30 as a rotating body. When a driving force of the engine E is transmitted to the shaft 30, the compressor 31 compresses refrigerant sucked from the evaporator 35 and discharges the compressed refrigerant toward the condenser 32. The evaporator 35 is disposed in the duct 21, and air is cooled while passing through the evaporator 35. A fan 32a for the condenser 32 is provided.

Figure 2:
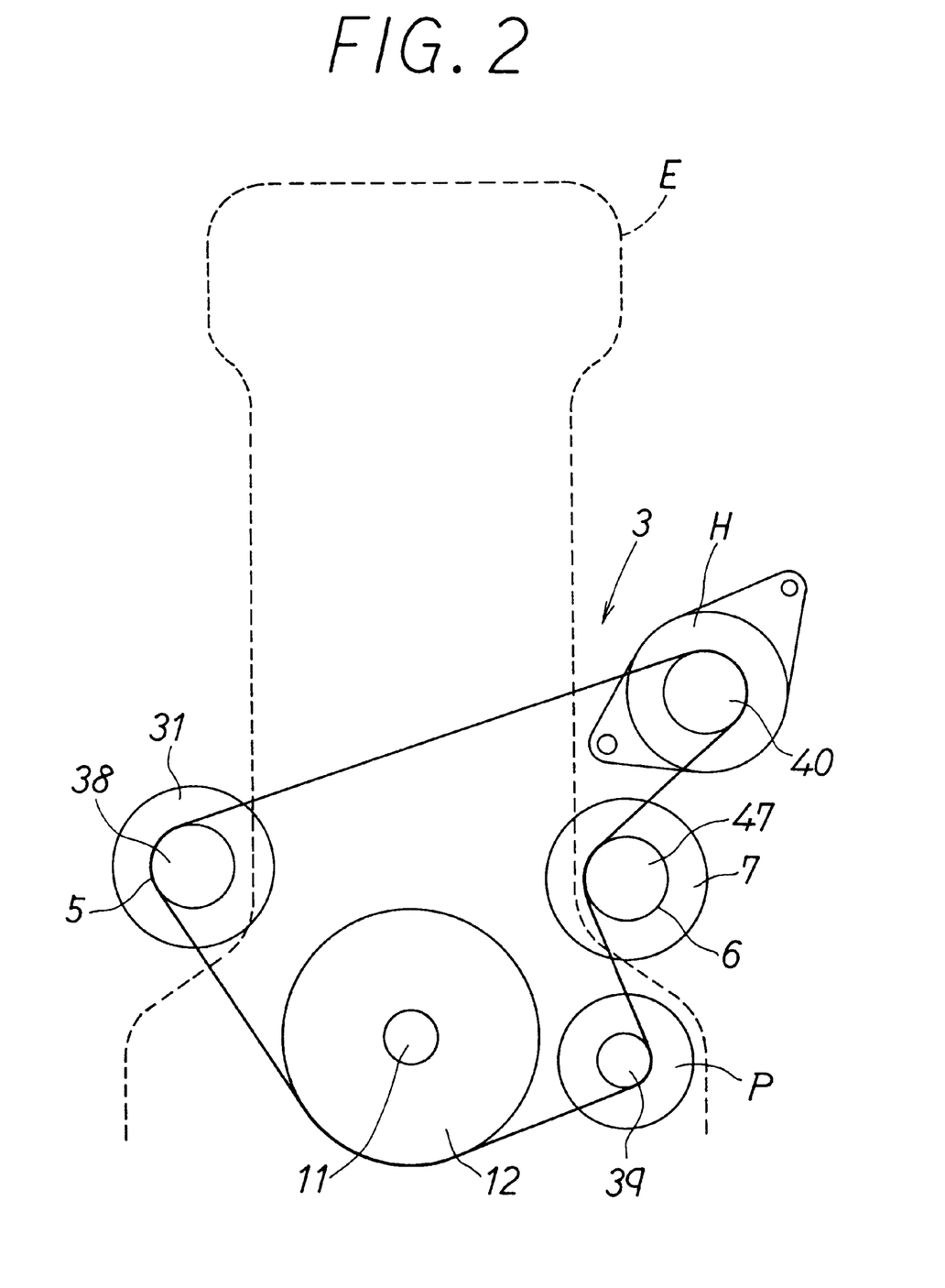
FIG. 2 is a schematic diagram showing an engine and a driving force transmission unit according to the first embodiment.
Figure 3:
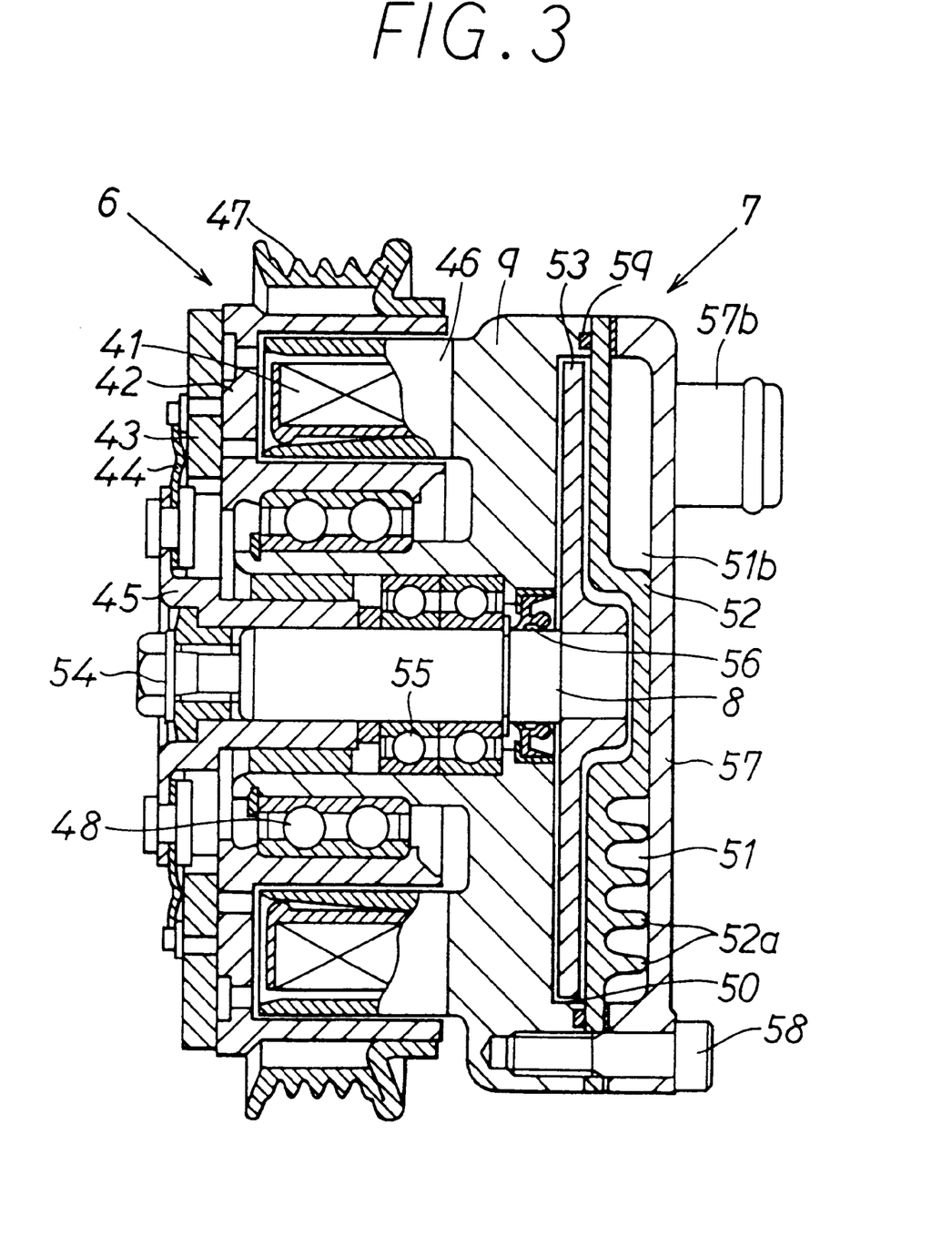
FIG. 3 is a cross-sectional view showing a viscous clutch and a viscous heater according to the first embodiment.

As shown in FIGS. 1–3, the driving force transmission unit 3 includes a multi-stage type V-belt 4 hung on a crank pulley 12 attached to the crank shaft 11 of the engine E, an electromagnetic clutch 5 (hereinafter referred to as "clutch") of the compressor 31, a V-pulley 39 of the hydraulic pump P of the power steering device, a V-pulley 40 of an alternator H, and an electromagnetic clutch (hereinafter referred to as "viscous clutch") 6 of the viscous heater 7. The V-belt is hung on the viscous clutch 6 and the clutch 5.

The V-belt 4 transmits a driving force (i.e., driving power) of the engine E to a shaft 30 of the compressor 31 through the clutch 5, the hydraulic pump P of the power steering device, the alternator H, and the shaft 8 of the viscous heater 7 through the viscous clutch 6.

The clutch 5 has a V-pulley 38 which is connected to the crank pulley 12 fitted to the crank shaft 11 of the engine E through the V-belt 4. When an electromagnetic coil of the clutch 5 is electrified, an output portion (i.e., armature, inner hub) is attracted to an input portion of the rotor so that a driving force of the engine E is transmitted to the shaft 30 of the compressor 31.

The power steering device includes the hydraulic pump P, a control valve (not shown), a power cylinder (not shown) and a steering gearbox (not shown) for controlling the control valve. The control valve detects a driver's steering operation and controls a hydraulic circuit and a pressure of oil discharged from the hydraulic pump P.

The hydraulic pump P is a rotating unit of the present invention. The hydraulic pump P has a shaft 37 and a rotor, the V-pulley 39 is fixed to the shaft 37 and the rotor, and the V-belt 4 is hung on the V-pulley 39. Therefore, a driving force of the engine E is transmitted to the hydraulic pump P through the V-belt 4 and the V-pulley 39 to generate an oil pressure for the power steering device. The alternator H includes a rotor and a shaft. The V-pulley 40 is fixed to the rotor and the shaft of the alternator H, and the V-belt 4 is also hung on the V-pulley 40 of the alternator H. Therefore, the alternator H is driven by the engine through the V-belt 4 to charge a battery installed in the vehicle.

As shown in FIG. 3, the viscous clutch 6 includes an electromagnetic coil 41 for generating an electromotive force when being electrified, a rotor 42 rotated by the engine E, an armature 43 attracted toward the rotor 42 rotated by the electromotive force of the electromagnetic coil 41, and an inner hub 45 connected to the armature 43 through a plate spring 44 and supplying a rotational force to the shaft 8 of the viscous heater 9. The electromagnetic coil 41 is formed by winding a conductive lead wire covered with an insulating material. The electromagnetic coil 41 is disposed in the stator 46 and is fixedly molded in the stator 46 with an epoxy resin. The stator 46 is fixed on a front surface of a housing 9 of the viscous heater 7.

The V-pulley 47 having the V-belt 4 on a periphery thereof is connected to the rotor 42 by connecting means such as welding. The rotor 42 is a rotating body which always rotates by the driving force of the engine E, transmitted thereto through the V-belt 4. The rotor 42 is formed of magnetic material to have a U-shaped cross section and is rotatably supported on an outer periphery of the housing 9 of the viscous heater 7 through a bearing 48 disposed in an inner periphery thereof.

The armature 43 has a friction surface formed in a ring-shaped plate, which is opposed to a friction surface of the rotor 42, formed in a ring-shaped plate, by an air gap therebetween. For example, a clearance between the friction surfaces is 0.5 mm. The armature 43 is made of a magnetic material. When the armature 43 is attracted to the friction surface of the rotor 42 by the electromotive force of the electromagnetic coil 41, the driving force of the engine E is transmitted from the rotor 42 to the armature 43.

The plate spring 44 is fixed to the armature 43 at an outer peripheral side by fixing means such as a rivet and is fixed to the inner hub 45 at an inner peripheral side by fixing means such as a rivet. The plate spring 44 is an elastic member. When the electric current supplying to the electromagnetic coil 41 is stopped, the plate spring 44 displaces the armature 43 in a direction (i.e., the left direction in FIG. 3)

so that the armature 43 is separated (released) from the friction surface of the rotor 42 to return the armature 43 to an initial position thereof.

The inner hub 45 is used as an output portion of the viscous clutch 6. The input side of the inner hub 45 is connected to and driven by the armature 43 through the plate spring 44 and the output side of the inner hub 45 is connected to the shaft 8 of the viscous heater 7 with a spline fitting connection.

The viscous heater 7 includes the shaft 8 rotated by the driving force of the engine E through the V-belt 4 and the viscous clutch 6, the housing 9 for rotatably supporting the shaft 8, a separator 52 for dividing an inner space of the housing 9 into a heat-generating chamber 50 and a cooling water passage 51, and a rotor 53 rotatably disposed in the housing 9.

The shaft 8 is an input shaft which is fixedly fastened to the inner hub 45 of the viscous clutch 6 by fastening means 54 such as a bolt and rotates integrally with the armature 43. The shaft 8 is rotatably disposed in an inner periphery of the housing 9 through a bearing 55 and a sealing member 56. The sealing member 56 employs an oil-seal for preventing a leakage of the viscous fluid.

The housing 9 is made of a metallic member such as aluminum alloy. A cover 57 formed in a ring-shaped plate is fixedly fastened to a rear end of the housing 9 by a fastening member 58 such as a bolt and a nut. The separator 52 and a sealing member 59 are attached on a surface where the housing 9 and the cover 57 are joined. The sealing member 59 employs an O-ring for preventing a leakage of the cooling water.

The separator 52 is a partition member which is made of a metallic member such as aluminum alloy, which is superior in heat conductivity. An outer peripheral portion of the separator 52 is sandwiched between a cylindrical portion of the housing 9 and a cylindrical portion of the cover 57. The heat-generating chamber 50 for sealing the viscous fluid (e.g., silicon oil) which generates heat when a shearing force is applied thereto is formed between a front end surface of the separator 52 and a rear end surface of the housing 9.

The cooling water passage 51 is formed between a rear end surface of the separator 52 and an inner surface of the cover 57, and is liquid-tightly partitioned from the outside. The cooling water for cooling the engine E flows through the cooling water passage 51. Further, a plurality of fin portions 52a having a substantially arcuate shape, for efficiently transmitting heat of the viscous fluid to the cooling water, is integrally formed on the rear end surface of the separator 52 at a lower side.

Instead of the fin portions 52a, the rear end surface of the separator 52 may be formed in a convex and concave shape, or a heat transmission facilitating member such as corrugated fins and fine pin fins may be formed on the outer wall surface of cover 57. Further, a labyrinth seal may be formed between the separator 52 and the rotor 53, and may be used as the heat-generating chamber 50.

Figure 4:
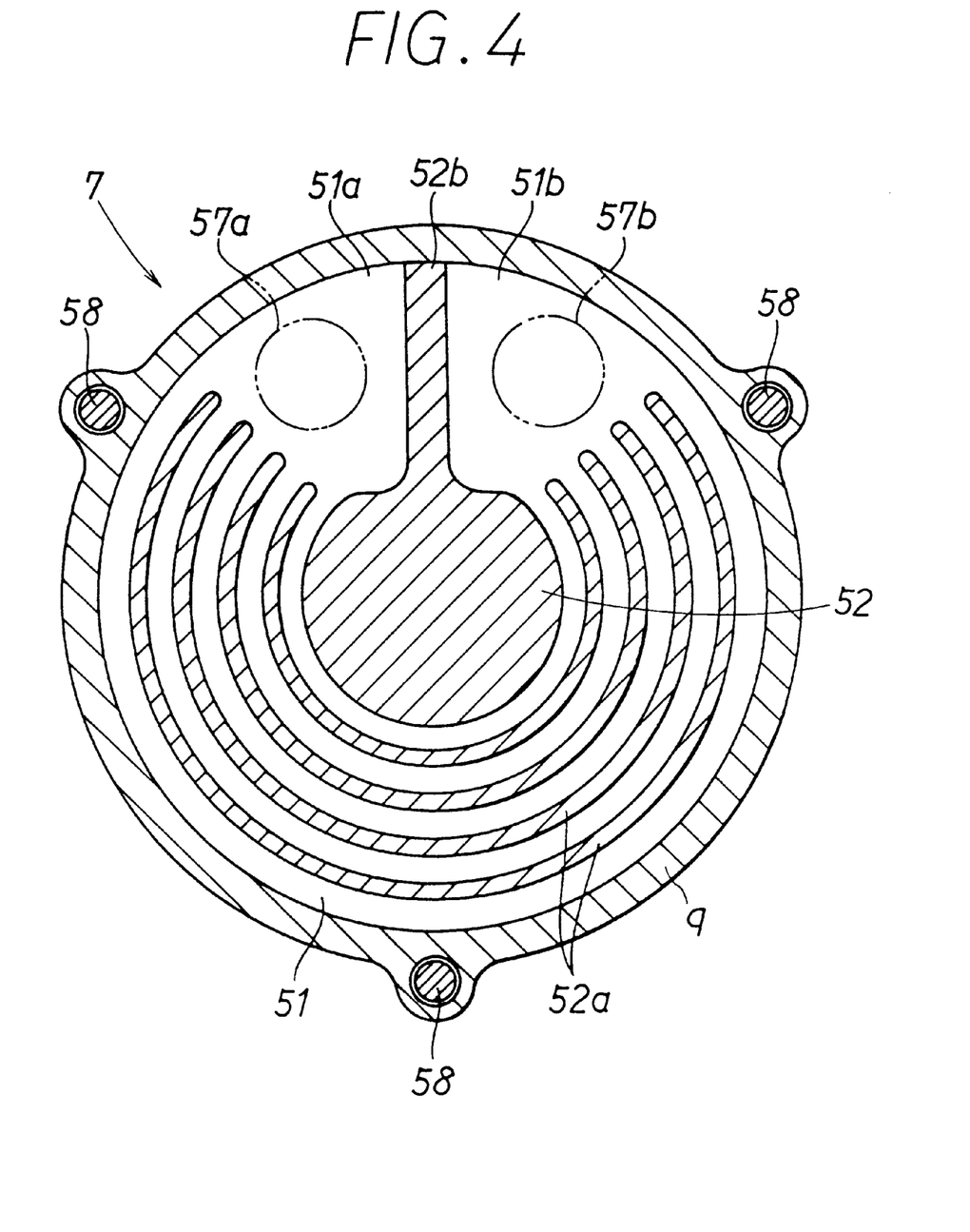
FIG. 4 is a cross-sectional view showing the viscous heater according to the first embodiment.

As shown in FIG. 4, a partition wall 52b for partitioning the cooling water passage 51 into an upstream side water passage 51a and a downstream side water passage 51b is formed to protrude from the rear end surface of the separator 52. An inlet side cooling water pipe 57a through which the cooling water flows into the cooling water passage 51 and an outlet side cooling water pipe 57b through which the cooling water flows out from the cooling water passage 51 are connected to an outer wall portion of the cover 57 near the partition wall 52b.

The rotor 53 is rotatably disposed in the heat-generating chamber 50 and is fixed to an outer periphery of the rear end portion of the shaft 8. A plurality of groove portions (not shown) are formed on an outer peripheral surface or both side wall surfaces of the rotor 53, and a protrusion portion is formed between each of the adjacent groove portions. When the driving force of the engine E is supplied to the shaft 8, the rotor 53 rotates integrally with the shaft 8 to generate a shearing force to the viscous fluid sealed in the heat-generating chamber 50.

Figure 5:
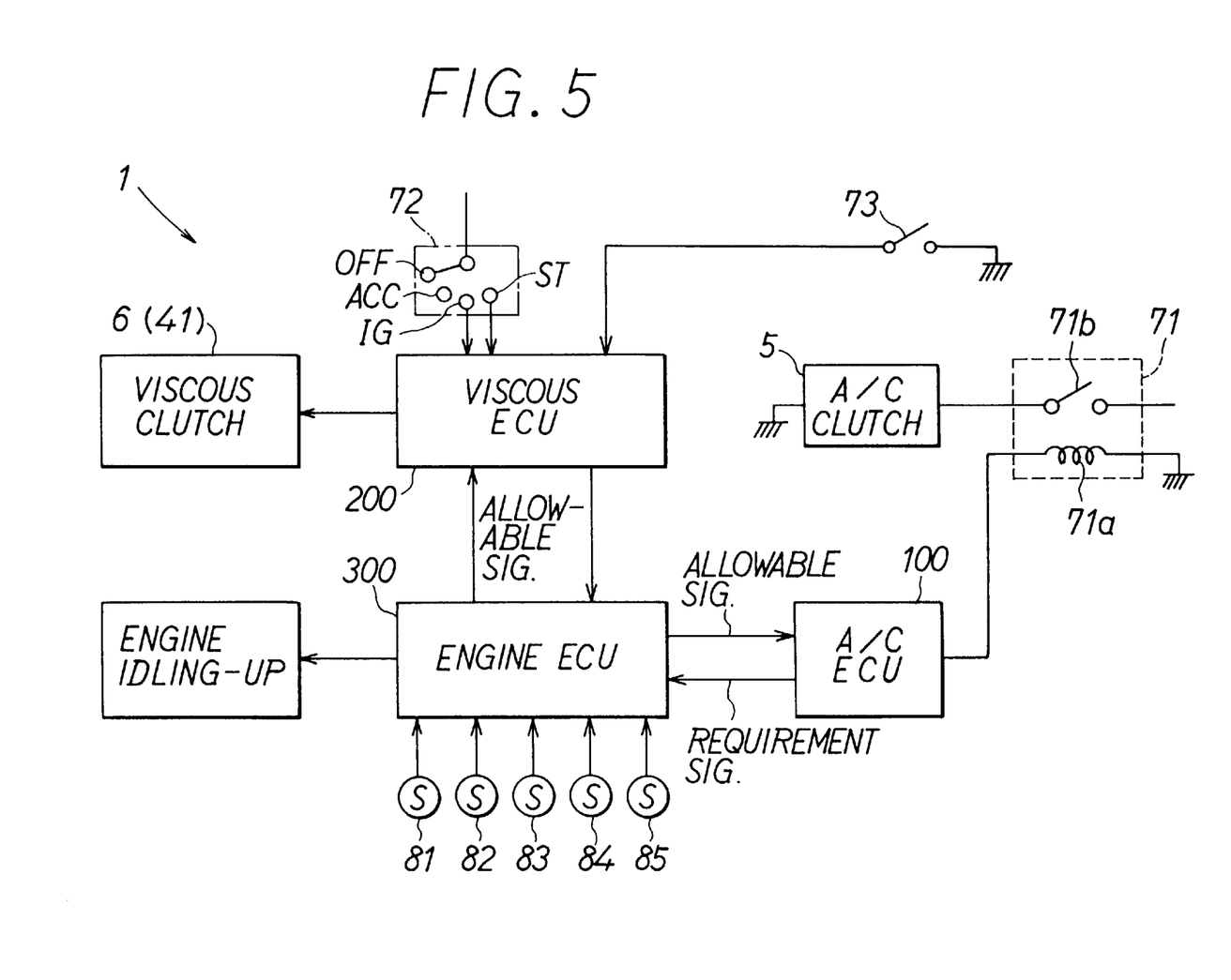
FIG. 5 is a block diagram showing an electric circuit of the air-conditioning apparatus for a vehicle according to the first embodiment.

Next an air-conditioning ECU 100 will be described briefly with reference to FIGS. 1, 2 and 5. FIG. 5 shows an electric circuit of the system 1.

The air-conditioning ECU 100 is an electric circuit for performing a computer control of a cooling and heating equipment such as the compressor 31 of the air-conditioning unit 2. The air-conditioning ECU 100 is a microcomputer in which a CPU, a ROM, and a RAM are incorporated.

The air-conditioning ECU 100 performs an air-conditioning control for the passenger compartment by controlling a cooling and heating equipment including the bower 22, the air mixing damper 27, and an air-conditioning clutch relay 71, and the like, based on input signals from each sensor and the engine ECU 300, and a pre-stored control program, and the like. The air conditioning clutch relay 71 includes a relay coil 71*a* and a relay switch 71*b*. When an electric current is supplied to the relay coil 71, the relay switch 71*b* is closed, thereby an electric current is supplied to an electromagnetic coil of the air-conditioning clutch 5.

Next, the viscous ECU 200 will be described with reference to FIGS. 1, 2, 5 and 6.

The viscous ECU 200 is an electric circuit for performing a computer control of a cooling and heating equipment such as the viscous heater 7. The viscous ECU 200 is a microcomputer in which a CPU, a ROM, and a RAM are incorporated.

The viscous ECU 200 performs an air-conditioning control for the passenger compartment by controlling a cooling and heating equipment such as the electromagnetic coil 41 of the viscous clutch 6, based on input signals input from an ignition switch 72, a viscous switch 73 and the engine ECU 300, and a pre-stored control program, and the like. The ignition switch 72 includes each terminal of OFF, ACC, ST and IG. The terminal of ST is a stator operation switch for outputting a signal for supplying an electric current to a stator to the viscous ECU 200.

The viscous switch 73 is a switch for preferring a heating operation for the passenger compartment by using the viscous heater 9. When the viscous switch 73 is set on, a heating preference signal is output to the viscous ECU 200. Further, the viscous switch 73 is an economical fuel consumption preference switch for giving an improvement of the fuel consumption rate (i.e., fuel economy) priority. When the viscous switch 73 is set off, a fuel consumption preference signal is output to the viscous ECU 200.

Figure 6:
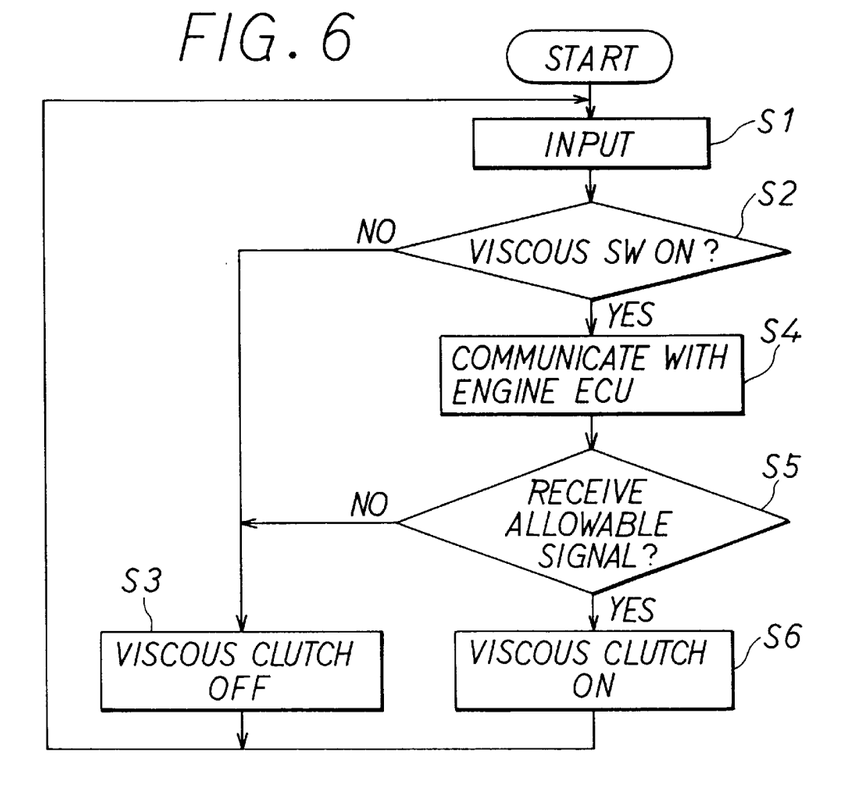
FIG. 6 is a flow chart showing a control program of a viscous ECU according to the first embodiment.

Next, the viscous ECU 200 will be briefly described with reference to FIGS. 1–6. FIG. 6 is a flow chart showing a control program of the viscous ECU 200 according to the first embodiment.

Firstly, various kinds of sensor signals and switch signals are input at step S1.

Next, it is determined whether or not the viscous switch 73 is set on, that is, whether or not the heating preference signal or the economical fuel consumption preference signal is input at step S2. When the determination is "NO", it is not necessary to heat the passenger compartment and a priority is given on the improvement of the fuel consumption rate of the engine E. Therefore, the electromagnetic coil 41 of the viscous clutch 6 is turned off, that is, the electric current supplying to the electromagnetic coil 41 of the viscous clutch 6 is stopped, and a rotation of the rotor 53 of the viscous heater 7 is stopped at step S3. Next, it proceeds to the process at the step S1.

When the determination is "YES" at the step S2, it performs a communication (transmits a signal to and receives a signal from) with the engine ECU 300 at step S4. Next, it is determined whether or not an allowable signal for allowing the electromagnetic coil 41 of the viscous clutch 6 to be turned on is received from the engine ECU 300. When the determination is "NO" at step S5, it proceeds to the process at step S3, and the electromagnetic coil 41 of the viscous clutch 6 is turned off.

When the determination is "YES" at the step S5, the electromagnetic coil 41 of the viscous clutch 6 is set on to compensate an insufficient heating capacity in the maximum heating operation. That is, an electric current is supplied to the electromagnetic coil 41 of the viscous clutch 6 so that the rotor 53 of the viscous heater 7 is rotated at step S6. Next, it proceeds to the process at the step S1.

Next, The engine ECU 300 will be described with reference to FIGS. 1, 5 and 7.

The engine ECU 300 is an electric circuit for an engine control system for performing a computer control of the engine E. The engine ECU 300 is a microcomputer in which a CPU, a ROM, and a RAM are incorporated.

Figure 7:
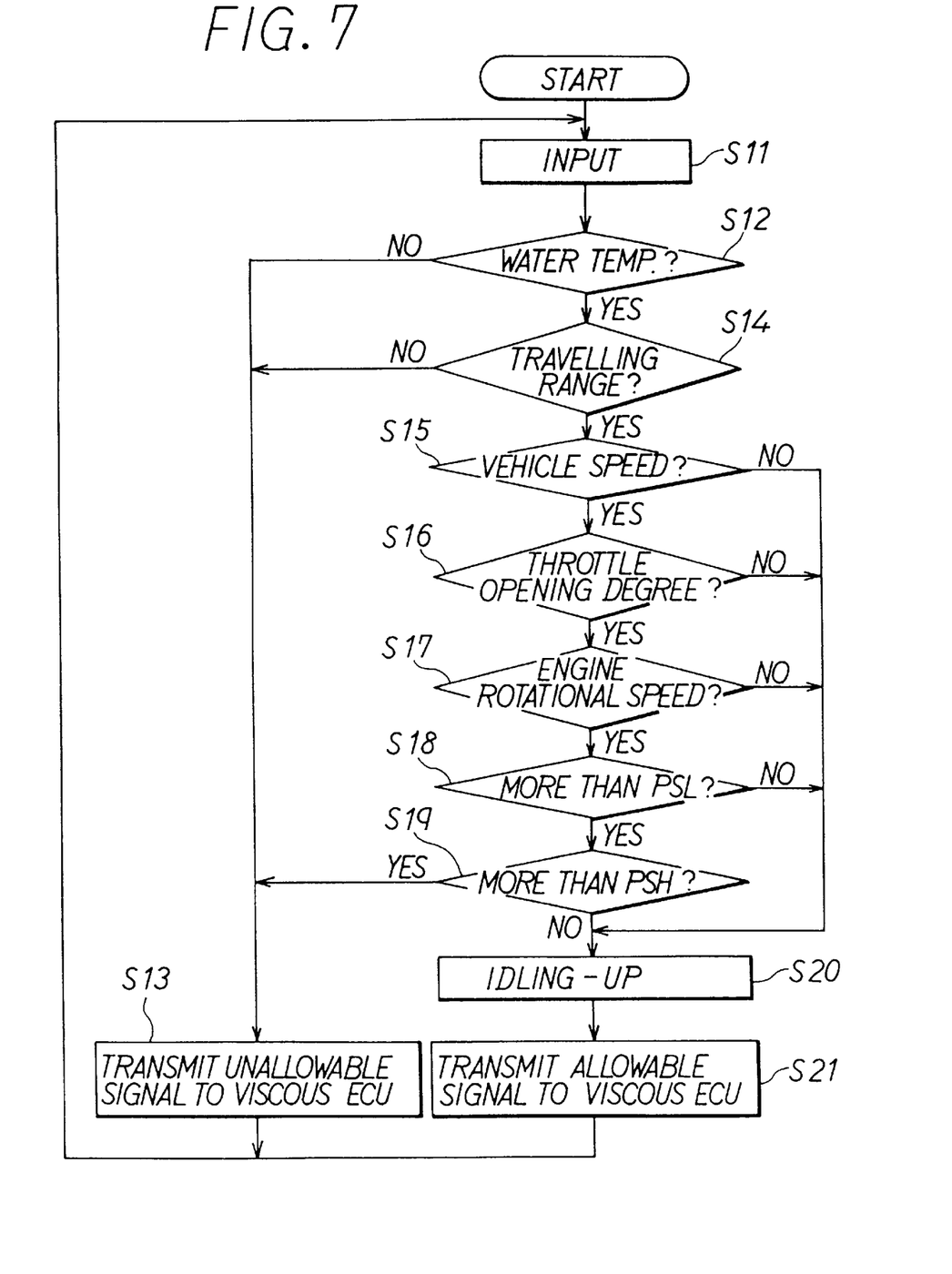
FIG. 7 is a flow chart showing a control program of an engine ECU according to the first embodiment.
Figure 8:
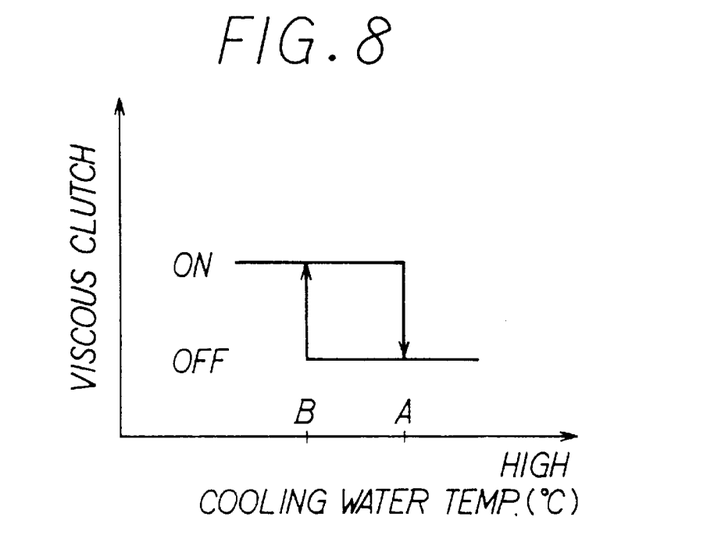
FIG. 8 is a graph for a control process of the engine ECU, showing a relationship between a cooling water temperature and an operation state of a viscous clutch in the first embodiment.

The engine ECU 300 performs an idling rotational speed control (i.e., idling-up control) of the engine E, a fuel injection amount control, a fuel injection timing control, an intake air throttle control, an electric current control to a glow plug, and the like, based on an engine rotational speed sensor 81, a vehicle speed sensor 82, a throttle opening sensor 83, a cooling water temperature sensor 84, a power steering pressure sensor 85, input signals input from the viscous ECU 200 and the pre-stored control program (reference to FIG. 7). The engine ECU 300 also transmits signals required for processes of the viscous ECU 200 thereto.

The engine rotational speed sensor 81 detects a rotational speed of the crank shaft 11 of the engine E and outputs an engine rotational speed signal to the engine ECU 300.

As the vehicle speed sensor 82, a reed switch type vehicle speed sensor, a photo-electric type vehicle speed sensor, or a MRE (i.e., Magnetic Resistance Element) type vehicle speed sensor can be used, for example. The vehicle speed sensor 82 detects a speed of the vehicle, and outputs a vehicle speed signal to the engine ECU 300.

The throttle opening sensor 83 detects an opening degree of the throttle valve disposed in an intake pipe of the engine E and outputs a throttle opening signal to the engine ECU 300.

The cooling water temperature sensor 84 employs a thermistor, for example, to detect a temperature of the cooling water in the cooling water circuit 10 (in this embodiment, a temperature of the cooling water of an outlet side cooling water pipe 57*b* of a cooling water passage 51 of the viscous heater 7), and outputs a cooling water temperature detection signal to the engine ECU 300.

The power steering pressure sensor 85 detects a pressure in a hydraulic circuit of the power steering device, and outputs a pressure detection signal to the engine ECU 300.

Next, a viscous heater control of the engine ECU 300 will be briefly described with reference to FIGS. 1, 5, 7 and 8. FIG. 7 is a flow chart showing a control program of the engine ECU 300 according to the first embodiment.

Firstly, various kinds of sensor signals and switch signals from the engine rotational speed sensor 81, the vehicle speed sensor 82, the throttle opening sensor 83, the cooling water temperature sensor 84, the power steering pressure sensor 85, and the like are input to the engine ECU 300 at step S11.

Next, it is determined whether or not the electromagnetic coil 41 of the viscous clutch 6 is set on or off according to the characteristics graph (reference to FIG. 8) of the viscous heater control based on the cooling water temperature, pre-stored in a memory circuit (e.g., ROM). That is, it is determined whether or not the cooling water temperature detected by the cooling water temperature sensor 84 is lower than a set cooling water temperature (i.e., the set value) at step S12. More specifically, as shown in the characteristics graph of FIG. 8, a hysteresis is given between a first set cooling water temperature A (e.g., 80° C.) and a second set cooling water temperature B (e.g., 70° C.). When the cooling water temperature is higher than the set cooling water temperature, the electromagnetic coil 41 of the viscous clutch 6 is set off. When the cooling water temperature is lower than the set cooling water temperature, the electromagnetic coil 41 of the viscous clutch 6 is set on. The hysteresis is set to the characteristics graph in FIG. 8; however, the hysteresis may not be given.

At the step S12, when the determination is "NO", an unallowable signal for allowing the electromagnetic coil 41 of the viscous clutch 6 not to be turned on are transmitted to the viscous ECU 200 at step S13. Then, it proceeds to the process at the step S11. Here, the process at the step S13 may be omitted. The off time of the electromagnetic coil 41 of the viscous clutch 6 is continued in a range of 0.5–2.5 seconds.

When the determination is "YES" at the step S12, it is determined whether or not a shift lever (i.e., select lever) is in a travelling range (e.g., D-range, 2-range or L-range) in an automatic vehicle at step S14. When the determination is "NO" at the step S14, it proceeds to the process at the step S13. When the determination is "YES" at the step S14, it is determined whether or not a driver in the passenger compartment of the vehicle performs a steering operation when the vehicle is stopped. Specifically, it performs the following determination.

Firstly, it is determined whether or not a vehicle speed detected in the vehicle speed sensor 82 is less than a predetermined vehicle speed (e.g., 5 km/h) at step S15. When the determination is "NO" at the step S15, it proceeds to the process at the step S20. When the determination is "YES", it is determined whether or not a throttle opening degree detected in the throttle opening sensor 83 is less than a predetermined opening degree (e.g., 0/90 degrees) at step S16. When the determination is "NO" at the step S16, it proceeds to the process at the step S20. When the determination is "YES" at the step S16, it is determined whether or not an engine rotational speed detected in the engine rotational speed sensor 81 is less than a predetermined rotational speed (e.g., 800 rpm) at step S17. When the determination is "NO" at the step S17, it proceeds to the process at the step S20.

Further, when the determination is "YES" at the step S17, it is determined whether or not a load applied to the hydraulic pump P is more than a first set value. That is, it is determined whether or not a pressure in the hydraulic circuit of the power steering device, detected by the power steering pressure sensor 85, is more than a first set pressure PSL (e.g., 20 kgf/cm$^2$) at step S18. When the determination is "NO" at the step S18, it proceeds to the process at the step S20. Here, the first set pressure PSL is a value when a driver performs the steering operation with a small steering angle, e.g., 20 degrees. When the determination is "YES" at the step S18, it is determined whether or not a load applied to the hydraulic pump is more than a second set value. That is, it is determined whether or not a pressure in the hydraulic circuit of the power steering device, detected by the power steering pressure sensor 85, is more than a second set pressure PSH (e.g., 30 kgf/cm$^2$) at step S19. When the determination is "YES" at the step S19, it is in a state where the driver performs the steering operation with a large steering angle. Therefore, it proceeds the process at the step S13, and unallowable signal is transmitted to the viscous ECU 200. Here, the second setting pressure PSL is a value when a driver performs the steering operation with a large steering angle, e.g., 30 degrees. When the determination is "NO" at the step S19, it is in a state where the driver performs the steering operation with a small steering angle. Therefore, an idling-up control in which an idling rotational speed of the engine E is stepwide increased to a target rotational speed (e.g., 1050 rpm) which is higher than an usual rotational speed (e.g., 600 rpm) is performed at step S20.

After performing the idling-up control in a predetermined time (e.g., 0.4 sec–0.5 sec), an allowable signal for allowing the electromagnetic coil 41 of the viscous clutch 6 to be turned on is transmitted to the viscous ECU 200. Next, it proceeds to the process at the step S11. Here, it may be determined whether or not an allowable signal for allowing the electromagnetic coil 41 of the viscous clutch 6 to be turned on is transmitted to the viscous ECU 200 based on only sensor signals detected by the engine rotational speed sensor 81, the vehicle speed sensor 82, and the throttle opening sensor 83, and the like.

Next, an operation of the system 1 according to the first embodiment will be briefly described with reference to FIGS. 1–8.

When the engine E starts, the crank shaft 11 of the engine E rotates, and the driving force of the engine E is transmitted to the rotor 42 of the viscous heater 7 through the V-belt 4. In this case, when the viscous switch 73 is turned on; a cooling water temperature detected by the cooling water temperature sensor 84 is lower than a predetermined temperature; and an allowable signal is received from the engine ECU 300, the electromagnetic coil 4 of the viscous clutch 6 is set on. That is, in a case where a driver does not performs the steering operation when the vehicle is stopped, the electromagnetic coil 41 of the viscous clutch 7 is turned on. Therefore, the armature 43 is attracted to the friction surface of the rotor 42 by electromotive force of the electromagnetic coil 41 to transmit the driving force of the engine E to the inner hub 45 and the shaft 8.

Because the rotor 53 rotates integrally with the shaft 8, a shearing force is applied to the viscous fluid in the heat-generating chamber 50 to generate heat. Therefore, when the cooling water heated in the water jacket 13 of the engine E passes through the cooling water passage 51 of the viscous heater 7, the cooling water is heated while absorbing heat generated in the viscous fluid through the plurality of the fin portions 52a formed integrally with the separator 52. The cooling water heated by the viscous heater 7 is supplied to the heater core 15 so that the heating operation of the passenger compartment is performed with a large heating capacity.

Further, the driving force of the engine E is also transmitted to the hydraulic pump P of the power steering device and the air conditioning clutch 5, the driver's steering operation can be readily performed. When a defrosting operation is performed for a windshield of the vehicle, the driving force of the engine E is transmitted to the compressor 31, and therefore warm air having a low humidity, which is cooled and dehumidified in the evaporator 35 and is reheated in the heater core 15, is blown out from the defroster air outlet 25a of the air duct 21 toward an inner surface of the windshield to defrost the windshield of the vehicle.

Even if the driving force of the engine E is transmitted to the rotor 42 of he viscous heater 6 and the conditions for the viscous heater 7 are satisfied, the electromagnetic coil 41 of the viscous clutch 6 is not turned on immediately when the pressure in the hydraulic circuit of the power steering device is more than the first set pressure PSL (e.g., 20 Kgf/cm$^2$) and lower than the second set pressure PSH (e.g., 30 Kgf/cm$^2$). In this case, after setting the idling rotational speed of the engine E to a high value, the electromagnetic coil 41 of the viscous clutch 6 is set on to prevent an engine stall. Thus, the heating operation of the passenger compartment is performed with a large heating operation.

When the electromagnetic coil of the air-conditioning clutch 5 of the compressor 31 is set off or the pressure in the hydraulic circuit of the power steering device is more than the second set pressure PSH (e.g., 30 kgf/cm$^2$), the electromagnetic coil 41 of the viscous clutch 6 is turned off. Therefore, the armature 43 is not attracted toward the friction surface of the rotor 42, and the driving force of the engine E is not transmitted to the inner hub 45 and the shaft 8.

Because the shaft 8 and the rotor 53 do not rotate, a large driving load is not applied to the engine E, the V-belt 4, and the viscous clutch 6 to prevent the engine stall. Thus, the driving force of the engine E is actually transmitted to the air-conditioning clutch 5 of the compressor 31, the hydraulic pump P of the power steering device and the alternator H to prevent to decrease the defrosting performance of the windshield and electric-generating performance. Further, the driver's steering operation is readily performed with a small steering angle.

As described above, according to the first embodiment, when a driver performs the steering operation with a large steering angle when the vehicle is stopped, the electromagnetic coil of the viscous clutch 6 is turned off even if the viscous switch 73 is set on and the cooling water temperature is lower than the predetermined temperature, thereby greatly reducing the driving load to be applied to the engine E, the V-belt 4 and the viscous clutch 6. As a result, it can suppress noise caused when the V-belt 4 or the viscous clutch 6 slides, and the rotating unit such as the hydraulic pump P of the power steering device, to which the V-belt is hung on, can be normally operated. Because a sufficient pressure can be generated by the hydraulic pump P, the driver's steering operation can be readily performed even if the vehicle is stopped. Further, the fuel consumption rate of the engine E can be improved.

According to the first embodiment, when the driver performs the steering operation with a small steering angle when the vehicle is stopped, the electromagnet coil 41 of the viscous clutch 6 is turned on after setting the rotational speed of the engine to a high value, to prevent the engine stall. Therefore, the viscous heater 7 is operated in this case so that the temperature of cooling water in the cooling water temperature circuit 10 can be maintained at a predetermined temperature (e.g., 80° C.). Thus, radiating amount in the heater core 15 becomes large, and air sufficiently heated while passing through the heater core 15 is blown out in the passenger compartment so that it can prevent the heating capacity for the passenger compartment from being lowered when a driver performs the steering operation when the vehicle is stopped.

Figure 9:
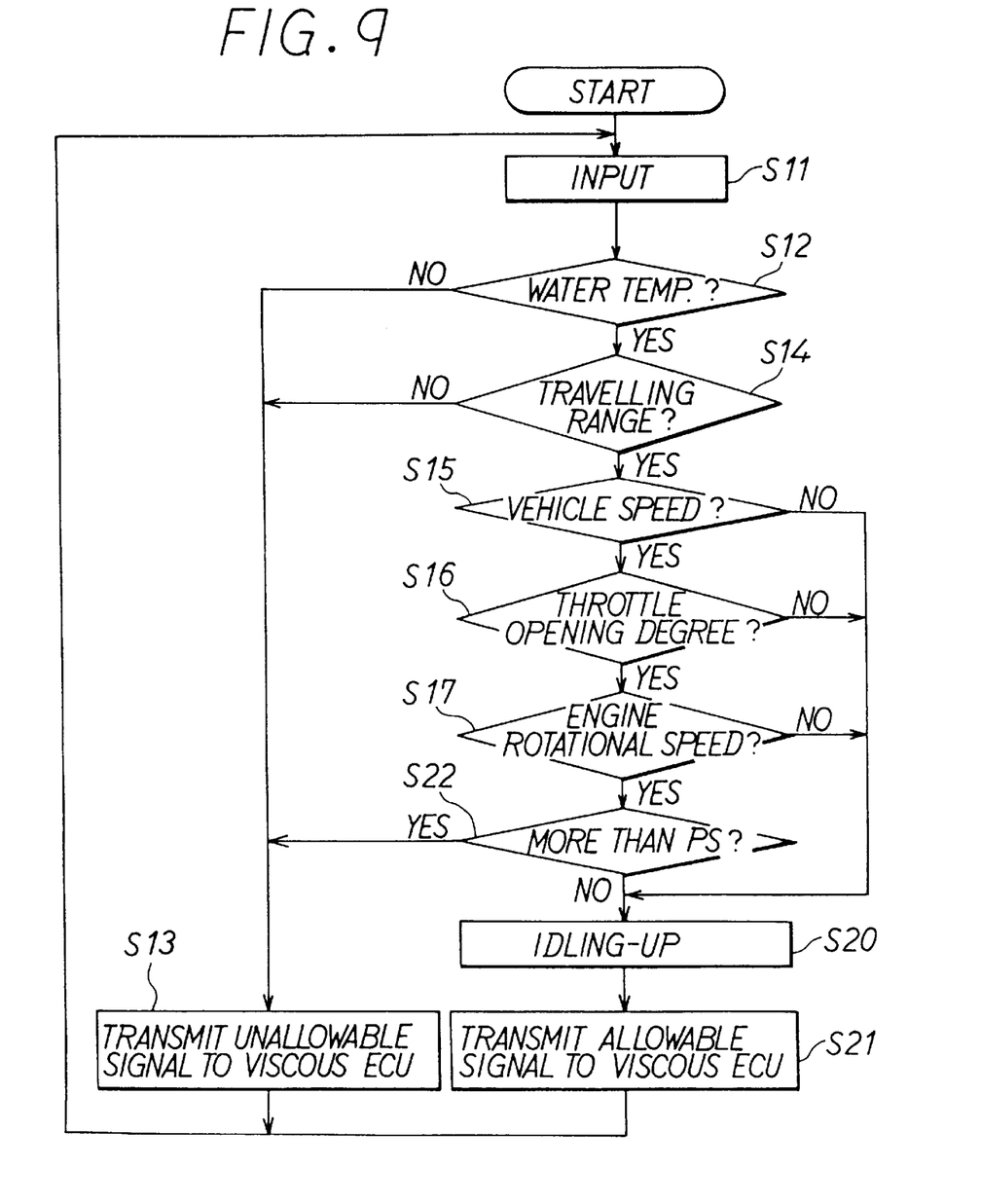
FIG. 9 is a flow chart showing a control program of an engine ECU according to a second preferred embodiment of the present invention.

A second preferred embodiment of the present invention will be described with reference to FIG. 9. FIG. 9 is a flow chart showing a control program of the engine ECU 300 according to the second embodiment. In FIG. 9, the steps identical to those in the first embodiment are shown with the same numerals, and the explanation thereof is omitted.

In the second embodiment, when the determination is "YES" at the step S17, it is determined whether or not a driver performs the steering operation when the vehicle is stopped, that is, it is determined whether or not the pressure in the hydraulic circuit of the power steering device, detected by the power steering pressure sensor 85, is more than a predetermined pressure PS (e.g., 30 kgf/cm$^2$). When the determination is "YES" at the step S22, it is determined that the driver performs the steering operation when the vehicle is stopped, and it proceeds to the process at the step S13 and an unallowable signal for allowing the electromagnetic coil 41 of the viscous clutch 6 not to be turned on is transmitted to the viscous ECU 200. When the determination is "NO", it proceeds to the process at the step S20.

Figure 10:
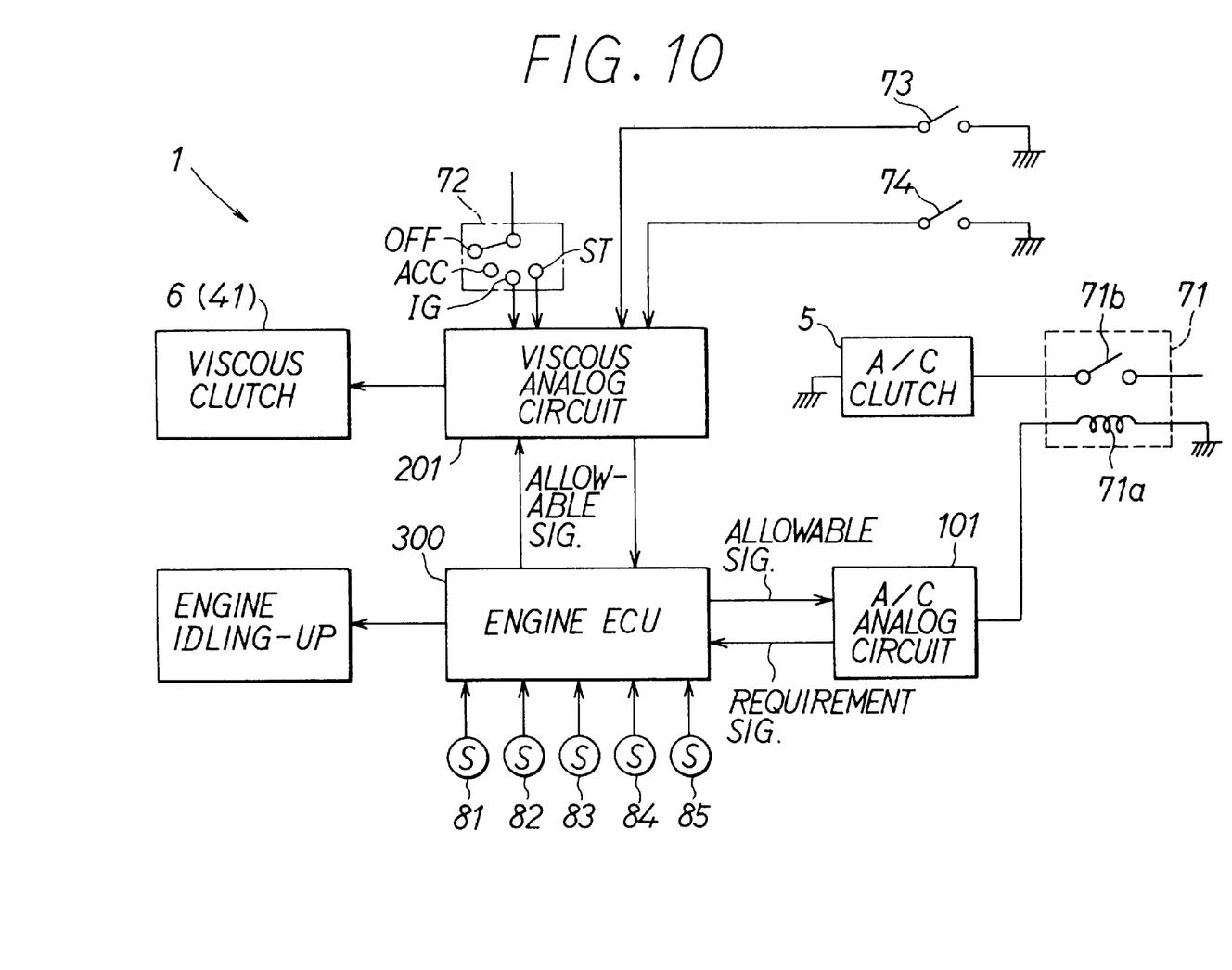
FIG. 10 is a block diagram showing an electric circuit of the air-conditioning apparatus for a vehicle according to a third preferred embodiment of the present invention.

A third preferred embodiment of the present invention will be described with reference to FIG. 10. FIG. 10 shows an electric circuit for an air-conditioning unit according to the third embodiment.

In the third embodiment, a manual air-conditioning unit is used as the air-conditioning unit. Instead of the viscous ECU 200 of the first embodiment, an air-conditioning analog circuit 101 for analog-controlling the manual air-conditioning unit 2 and a viscous analog circuit 201 for analog-controlling the viscous clutch 6 are provided in the electric circuit as shown in FIG. 10.

The engine ECU 300 and the various sensors and the like are connected an input side of the air-conditioning analog circuit 101. The blower 22, the air mixing damper 27, the air-conditioning clutch relay 71 and the engine ECU 300 are connected to an output side of the air-conditioning analog circuit 101. At an input side of the viscous analog circuit 201, the terminals of ST and IG of the ignition switch 72, the viscous switch, the cooling water temperature switch 74 and the engine ECU 300 are connected. Further, at an output side of the viscous analog circuit 201, the electromagnetic coil 41 of the viscous clutch 6 and the engine ECU 300 are connected.

When the cooling water temperature (in the third embodiment, the cooling water temperature in the outlet side cooling water pipe 57b of the cooling water passage 51 of the viscous heater 7) is more than a first predetermined temperature A (e.g., 80° C.), the cooling water temperature switch 74 is set off. When the cooling water temperature is less than the first predetermined temperature A or a second predetermined temperature B (e.g., 70–75° C.), the cooling water temperature switch is set on.

Further, when the engine ECU 300 receives an "on" signal from the viscous analog circuit 201, the engine ECU 300 determines whether or not an allowable signal for allowing the air conditioning unit 2 and the viscous heater 7 to be turned on is transmitted to the viscous analog circuit 201 based on an engine rotational speed, a vehicle speed, a throttle opening degree and the cooling water temperature.

In the third embodiment, even if the cooling water temperature switch 74 is set on, the electromagnetic coil 41 of the viscous clutch 6 is set off when it is determined that a driver performs the steering operation when the vehicle is stopped, according to the method of the first embodiment or the second embodiment. Thus, in the third embodiment, an effect similar to that of the first embodiment can be provided.

Although the present invention has been fully described in connection with preferred embodiments thereof with reference to the accompanying drawings, it is to be noted that various changes and modifications will become apparent to those skilled in the art.

For example, in each of the above-described embodiments, the V-belt 4 and the viscous clutch 6 are connected to and driven by the crank shaft 11 of the engine E to rotate the shaft 8 of the viscous heater 7; however, the viscous clutch 6 may be directly connected to the crank shaft 11 of the engine E to rotate the shaft 8 of the viscous heater 7. Further, a gear transmission having at least one stage gear or a V-belt type non-stage transmission may be connected between the crank shaft 11 of the engine E and the viscous clutch 6 or between the viscous clutch 6 and the shaft 8 of the viscous heater 7.

In the above-described embodiments, the V-belt 4 is hung on the hydraulic pump P of the power steering device, the alternator H, the air-conditioning clutch 5 and the viscous clutch 6; however, the V-belt 4 may be hung on only both of the hydraulic pump P and the viscous clutch 6. Further, the V-belt 4 may be hung on a supplementary equipment such as a blower device for supplying cooling air to a radiator, a hydraulic pump for supplying operation oil to the automatic transmission, or a hydraulic pump for supplying lubricating oil to the engine E with the viscous clutch 6. Further, the hydraulic pump P of the power steering device and the viscous clutch 6 may be respectively connected to the crank shaft 11 of the engine E by using a plurality of V-belt 4. Instead of the V-belt 4, a plurality of transmission method such as a chain may be used.

In each of the above-described embodiment, a water-cooled diesel engine is used as the engine E; however, the other water-cooled engine such as a gasoline engine may be used. Further, the compressor 31 and the viscous heater 7 may be driven by the other water-cooled engine or an air-cooled engine which are not used as the above-described engine E and as the heating source.

In each of the above-described embodiments, the present invention is applied to an air-conditioning apparatus for a vehicle to perform a heating operation and a cooling operation for the passenger compartment; however, the present invention may be applied to an air-conditioning apparatus for a vehicle to perform only a heating operation for the passenger compartment.

In each of the above-described embodiments, the power steering pressure sensor 85 is used as means for detecting a physical amount relative to a pressure in the hydraulic circuit of the power steering device; however a pressure sensor or a pressure switch for detecting a pressure of oil discharged from the hydraulic pump P may be used as the physical amount detection means. Further, as the physical amount detection means, a flow amount sensor or a flow amount switch for detecting a flow amount of oil discharged from the hydraulic pump P of the power steering device may be used.

A load applied to the engine E or the hydraulic pump P may be detected based on a tension of the V-belt or a temperature of cooling water for cooling the engine E. Further, instead of the power steering pressure sensor 85, physical amount detection means for detecting a physical amount relative to a driver's steering operation, for example, a steering angle sensor or a steering angle switch for detecting a steering angle of the driver's steering operation may be used.

Such changes and modifications are to be understood as being within the scope of the present invention as defined by the appended claims.

What is claimed is:

1. A heating apparatus for heating a passenger compartment of a vehicle having a driving source unit, comprising:

a heating heat exchanger for heating said passenger compartment by performing heat-exchange between a thermal medium and air to be blown into said passenger compartment;

a heat-generating unit using a shearing force, said heat-generating unit including a rotor which rotates when a driving force of said driving source unit is applied thereto and a heat-generating chamber for sealing therein viscous fluid which generates heat for heating said thermal medium to be supplied to said heating heat exchanger when a shearing force generated by a rotational force of said rotor is applied to said viscous fluid;

a rotating unit which rotates when the driving force of said driving source unit is transmitted thereto;

a driving force transmission unit having a clutch unit for intermitting a transmission of the driving force, from said driving source unit to said rotor, the driving force, from said driving source unit to said rotor, the driving force of said driving source unit being transmitted to said rotor and said rotating unit through said clutch unit; and a heating control unit which controls said clutch unit to a stop a rotation of said rotor when a load applied to said driving source unit is more than a predetermined value;

wherein said rotating unit is a hydraulic pump for generating an oil pressure for driving a power steering device, said heating control unit includes load detection means for detecting a load applied to said hydraulic pump, and said heating control unit controls said clutch unit to stop said rotor when a load applied to said hydraulic pump, detected by said load detection means, is more than a predetermined value.

2. A heating apparatus according to claim 1, wherein, said heating control unit includes physical amount detection means for detecting a physical amount relative to a pressure of oil discharged from said hydraulic pump, and said heating control unit controls said clutch unit to stop a rotation of said rotor when said physical amount detected by said physical amount detection means is more than a predetermined value.

3. A heating apparatus according to claim 1, wherein, said heating control unit includes physical amount detection means for detecting a physical amount relative to a flow amount of oil discharged from said hydraulic pump, and said heating control unit controls said clutch unit to stop a rotation of said rotor when said physical amount detected by said physical amount detection means is more than a predetermined value.

4. A heating apparatus according to claim 1, wherein, said heating control unit includes steering angle detection means for detecting a steering angle of a driver's steering operation, and said heating control unit controls said clutch unit to stop a rotation of said rotor when the steering angle detected by said steering angle detection means is more than a predetermined value.

5. A heating apparatus for heating a passenger compartment of a vehicle having a driving source unit, comprising:

a heating heat exchanger for heating said passenger compartment by performing heat-exchanger between a thermal medium and air to be blown into said passenger compartment;

a heat-generating unit using a shearing force, said heat-generating unit including a rotor which rotates when a driving force of said driving source unit is applied thereto and a heat-generating chamber for sealing therein viscous fluid which generates heat for heating said thermal medium to be supplied to said heating heat exchanger when a shearing force generated by a rotational force of said rotor is applied to said viscous fluid;

a rotating unit which rotates when the driving force of said driving source unit is transmitted thereto;

a driving force transmission unit having a clutch unit for intermitting a transmission of the driving force, from said driving source unit to said rotor, the driving force of said driving source unit being transmitted to said rotor through said clutch unit; and a heating control unit which controls said clutch unit to rotate said rotor after increasing an idling rotational speed of said driving source unit to a predetermined value when a load applied to said driving source unit is more than a first set value and lower than a second set value.

6. A heating apparatus according to claim 5, wherein said heating control unit controls said clutch unit to stop a rotation of said rotor when a load applied to said driving source unit is more than said second set value.

7. A heating apparatus according to claim 5, wherein, said rotating unit is a hydraulic pump for generating an oil pressure for driving a power steering device, said heating control unit includes load detection means for detecting a load applied to said hydraulic pump, and said heating control unit controls said clutch unit to rotate said rotor after increasing an idling rotational speed of said driving source unit to a predetermined value when a load applied to said hydraulic pump, detected by said load detection means, is more than a first set value and lower than a second set value.

8. A heating apparatus according to claim 7, wherein said heating control unit controls said clutch unit to stop a rotation of said rotor when a load applied to said hydraulic pump is more than said second set value.

9. A heating apparatus according to claim 5, wherein, said heating control unit includes physical amount detection means for detecting a physical amount relative to a pressure of oil discharged from said hydraulic pump, and said heating control unit controls said clutch unit to rotate said rotor after increasing an idling rotational speed of said driving source unit to a predetermined value when the physical amount detected by said physical amount detection means is more than a first set value and lower than a second set value.

10. A heating apparatus according to claim 9, wherein said heating control unit controls said clutch unit to stop a rotation of said rotor when the physical amount detected by said physical amount detection means is more than said second set value.

11. A heating apparatus according to claim 5, wherein, said heating control unit includes physical amount detection means for detecting a physical amount relative to a flow amount of oil discharged from said hydraulic pump, and said heating control unit controls said clutch unit to rotate said rotor after increasing an idling rotational speed of said driving source unit to a predetermined value when said physical amount detected by said physical amount detection means is more than a first set value and lower than a second set value.

12. A heating apparatus according to claim 5, wherein, said heating control unit includes steering angle detection means for detecting a steering angle of a driver's steering operation, and said heating control unit controls said clutch unit to rotate said rotor after increasing an idling rotational speed of said driving source unit to a predetermined value when the steering angle detected by said steering angle detection means is more than a first value and lower than a second value.

13. A heating apparatus for heating a passenger compartment of a vehicle having a driving source unit, comprising:

a heating heat exchanger for heating said passenger compartment by performing heat-exchange between a thermal medium and air to be blown into said passenger compartment;

a heat-generating unit using a shearing force, said heat-generating unit including a rotor which rotates when a driving force of said driving source unit is applied thereto and a heat-generating chamber for sealing therein viscous fluid which generates heat for heating said thermal medium to be supplied to said heating heat exchanger when a shearing force generated by a rotational force of said rotor is applied to said viscous fluid;

a rotating unit which rotates when the driving force of said driving source unit is transmitted thereto;

a driving force transmission unit for transmitting the driving force of said driving source unit to said rotor and said rotating unit;

shearing state switching means for switching a shearing state of the viscous fluid by the rotational force of said rotor; and a heating control unit which controls said shearing state switching means to stop a shearing force applied to the viscous fluid by the rotational force of said rotor when a load applied to said driving source unit is more than a predetermined value;

wherein said rotating unit is a hydraulic pump for generating an oil pressure for driving a power steering device, said heating control unit includes load detection means for detecting a load applied to said hydraulic pump, and said heating control unit controls said clutch unit to stop said rotor when a load applied to said hydraulic pump, detected by said load detection means, is more than a predetermined value.

14. A heating apparatus for heating a passenger compartment of a vehicle having a driving source unit, comprising:

a heating heat exchanger for heating said passenger compartment by performing heat-exchange between a thermal medium and air to be blown into said passenger compartment;

a heat-generating unit using a shearing force, said heat-generating unit including a rotor which rotates when a driving force of said driving source unit is applied thereto and a heat-generating chamber for sealing therein viscous fluid which generates heat for heating said thermal medium to be supplied to said heating heat exchanger when a shearing force generated by a rotational force of said rotor is applied to said viscous fluid;

a rotating unit which rotates when the driving force of said driving source unit is transmitted thereto;

a driving force transmission unit for transmitting the driving force of said driving source unit to said rotor and said rotating unit;

shearing state switching means for switching a shearing state of the viscous fluid by the rotational force of said rotor; and a heating control unit which controls said shearing state switching means to rotate said rotor after increasing an idling rotational speed of said driving source unit to a predetermined value when a load applied to said driving source unit is more than a first set value and lower than a second set value.

15. A heating apparatus according to claim 14, wherein said heating control unit controls said shearing state switching means to stop a shearing force applied to the viscous fluid by the rotational force of said rotor when a load applied to said driving source unit is more than said second set value.

16. A heating apparatus according to claim 13, wherein, said heating control unit includes physical amount detection means for detecting a physical amount relative to a pressure of oil discharged from said hydraulic pump, and said heating control unit controls said clutch unit to stop a rotation of said rotor when said physical amount detected by said physical amount detection means is more than a predetermined value.

17. A heating apparatus according to claim 13, wherein, said heating control unit includes physical amount detection means for detecting a physical amount relative to a flow amount of oil discharged from said hydraulic pump, and said heating control unit controls said clutch unit to stop a rotation of said rotor when said physical amount detected by said physical amount detection means is more than a predetermined value.

18. A heating apparatus according to claim 13, wherein, said heating control unit includes steering angle detection means for detecting a steering angle of a driver§s steering operation, and said heating control unit controls said clutch unit to stop a rotation of said rotor when the steering angle detected by said steering angle detection means is more than a predetermined value.

* * * * *